(12) United States Patent
Fitzmaurice et al.

(10) Patent No.: US 6,755,993 B2
(45) Date of Patent: *Jun. 29, 2004

(54) ELECTROCHROMIC SYSTEM

(75) Inventors: Donald Fitzmaurice, Dublin (IE); S. Rao Nagaraja, Dublin (IE); Rachel Cinnsealach, Baile Atha Cliath (IE); Brendan Enright, Cork (IE)

(73) Assignee: University College Dublin, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 10/423,115

(22) Filed: Apr. 25, 2003

(65) Prior Publication Data

US 2004/0056239 A1 Mar. 25, 2004

Related U.S. Application Data

(62) Division of application No. 09/952,867, filed on Sep. 12, 2001, now Pat. No. 6,605,239, which is a continuation of application No. 09/367,024, filed as application No. PCT/IE98/00008 on Feb. 6, 1998, now Pat. No. 6,301,038.

(30) Foreign Application Priority Data

Feb. 6, 1997 (IE) .............................................. S970082

(51) Int. Cl.[7] ................................................. G02F 1/15
(52) U.S. Cl. ....................... 252/583; 252/586; 359/265; 359/270; 359/272; 428/315.5; 428/411.1; 428/469; 428/702; 428/704
(58) Field of Search ................................. 252/583, 586; 359/265, 270, 272; 428/315.5, 411.1, 469, 702, 704

(56) References Cited

U.S. PATENT DOCUMENTS

| | | | |
|---|---|---|---|
| 4,343,537 A | 8/1982 | Guntherodt et al. | |
| 5,480,629 A | 1/1996 | Thompson et al. | |
| 5,910,854 A | 6/1999 | Varaprasad | |
| 6,067,184 A | 5/2000 | Bonhote et al. | |
| 6,301,038 B1 | 10/2001 | Fitzmaurice et al. | |
| 6,426,827 B1 | 7/2002 | Bonhote et al. | |

FOREIGN PATENT DOCUMENTS

| | | |
|---|---|---|
| WO | WO 95/30495 | 11/1995 |
| WO | WO 97/35227 | 9/1997 |
| WO | WO 02/12954 A1 | 2/2002 |

OTHER PUBLICATIONS

Bechinger, et al., Photoelectrochromic windows and displays, Nature, vol. 383, Oct. 17, 1996, pp. 608–610 XP 002064353.

Lampert, et al., Large–Area Chromogenics: Materials and Devices for Transmittance Control, SPIE Institutes for Advanced Optical Technologies, vol. IS 4; Sep. 22–24, 1988, Hamburg, Germany.

Hagfeldt, Anders, et al. Nanostructured TiO2 Semiconductor Electrodes Modified with Surface Attached Viologens: Applications for Displays and Smart Windows, Institut de Chimie Physique, Lausanne, Switzerland, SPIE, vol. 2531, pp. 60–69.

Thompson et al., Stable photoinduced charge separation in layered viologen compounds, Nature, vol. 358, 1992, pp. 656–658.

*Primary Examiner*—Philip C. Tucker
(74) *Attorney, Agent, or Firm*—Christie, Parker & Hale, LLP

(57) ABSTRACT

A method for the manufacture of an electrochromic system using a nanoporus-nanocrystalline film comprising a semiconducting metallic oxide having a redox chromophore adsorbed thereto.

9 Claims, 9 Drawing Sheets

ELECTROCHROMIC SYSTEM

CROSS-REFERENCE TO RELATED APPLICATIONS

This application is a divisional of application Ser. No. 09/952,867, filed Sep. 12, 2001, now U.S. Pat. No. 6,605,239 which is a continuation of application Ser. No. 09/367,024, filed Oct. 26, 1999 now U.S. Pat. No. 6,301,038, issued Oct. 9, 2001, which was based on a International application no. PCT/IE98/00008, with an international filing date Feb. 6, 1998, having a priority based on Irish patent application no. S970082, filed Feb. 6, 1997.

BACKGROUND OF THE INVENTION

The present invention relates to improvements in or relating to electrochromic systems.

As the energy performance of buildings and automobiles becomes an increasingly important design feature, strategies for optimising performance in this respect are receiving considerable attention.

An important aspect of the energy performance of the above relates to the incident radiation transmitted by the window area of a building. Such concerns are further complicated by the need to ensure occupant comfort. It is in this context that the electrochromic (EC) window technology has assumed increasing importance, the amount of incident radiation transmitted by such windows being electronically controllable. Effective implementation of EC window technology in buildings is expected to provide the following benefits:

1. Reduce adverse cooling effects. Reduce cooling energy. Down-size air conditioning plant. Reduce peak electricity demand.
2. Increase beneficial effects of daylight. Reduce lighting energy. Reduce peak electricity demand.
3. Increase occupant comfort. Increase thermal comfort. Increase visual comfort.

Even greater benefits would be expected to accrue in an automobile, where the ratio of glazed surface to enclosed volume is significantly larger than in a typical building. Specifically, effective implementation of EC window technology in automobiles is expected to provide the following benefits in addition to those in the built environment:

1. Increased motoring safety. Reduced glare. Mirror control. Head-up display.

EC technology is not limited to the applications described above. Others include privacy glass, angle-independent high-contrast large-area displays, glare-guards in electronic devices, electronic scratch pads.

Existing EC devices, including those commercially available, are non-optimal for the large glazing areas encountered in building and automotive applications and are based on technologies which are process and energy intensive. Therefore new EC technologies, resulting in improved device specification and which may be manufactured more easily at a lower cost, will be commercially important. It is noted in this context, that the current market for EC window technologies in buildings and automobiles is estimated world-wide at over $2 billion.

For an overview of these and related topics see the review *Large-Area Chromogenics:Materials and Devices for Transmittance Control* (Eds. Lampert and Granqvist), SPIE Institutes for Advanced Optical Technologies Series Vol. 4. Existing EC devices are found in one of the two categories outlined below. Firstly, there are those devices based on ion insertion reactions at metal oxide electrodes. To ensure the desired change in transmittance the required number of ions must be intercalated in the bulk electrode to compensate the accumulated charge. However, use of optically flat metal oxide layers requires bulk intercalation of ions as the surface area in contact with electrolyte is not significantly larger than the geometric area. As a consequence the switching times of such a device are typically of the order of tens of seconds.

Secondly, there are those devices based on a transparent conducting substrate coated with a polymer to which is bound a redox chromophore. On applying a sufficiently negative potential there is a transmittance change due to formation of the reduced form of the redox chromophore. To ensure the desired change in transmittance a sufficiently thick polymer layer is required, the latter implying the absence of an intimate contact between the transparent conducting substrate and a significant fraction of the redox chromophores in the polymer film.

As a consequence the switching times of such a device are, as above, typically of the order of tens of seconds.

SUMMARY OF THE INVENTION

It is an object of the present invention to provide an improved EC system.

According to the invention there is provided a nanoporous-nanocrystalline film comprising a semiconducting metallic oxide having a redox chromophore adsorbed thereto.

A "nanocrystalline film" is constituted from fused nanometer-scale crystallites. In a "nanoporous-nanocrystalline" film the morphology of the fused nanocrystallites is such that it is porous on the nanometer-scale. Such films, which may hereinafter be referred to as nano-structured films, typically possess a surface roughness of about 1000 assuming a thickness of about 10 $\mu$m.

The nanostructured films used in the present invention colour on application of a potential sufficiently negative to accumulate electrons in the available trap and conduction band states. As a consequence of the high surface roughness of these films, ions are readily adsorbed/intercalated at the oxide surface permitting efficient charge compensation and rapid switching, i.e. the need for bulk intercalation is eliminated. However, despite the rapid switching times in such films, the associated change in transmittance is not sufficient for a commercial device. To overcome this limitation a redox chromophore is adsorbed at the surface of the transparent nanostructured film which, when reduced, increases the extinction coefficient of an accumulated trapped or conduction band electron by more than an order of magnitude. Further, due to the nanoporous structure and associated surface roughness of the nanocrystalline films used, the redox chromophore is effectively stacked as in a polymer film, while at the same time maintaining the intimate contact with the metal oxide substrate necessary to ensure rapid switching times.

The redox chromophore may be any suitable redox chromophore and preferably comprises a compound of the general formula I

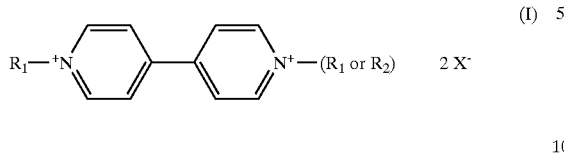
(I)

wherein X is a charge balancing ion such as a ion such as a halide; R1 is any one of the following:

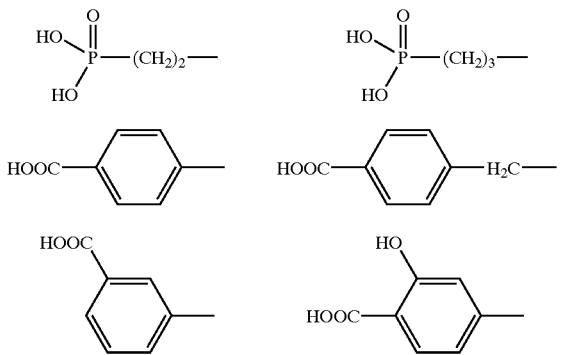

and $R_2$ is any one of the following:

(a) —O⁻

(b) —CH₂CH₃

(c) —N(CH₃)₂

(d) —CH₂—C₆H₅

(e) 2,4-dinitrophenyl (f) —CH₂CN (g)
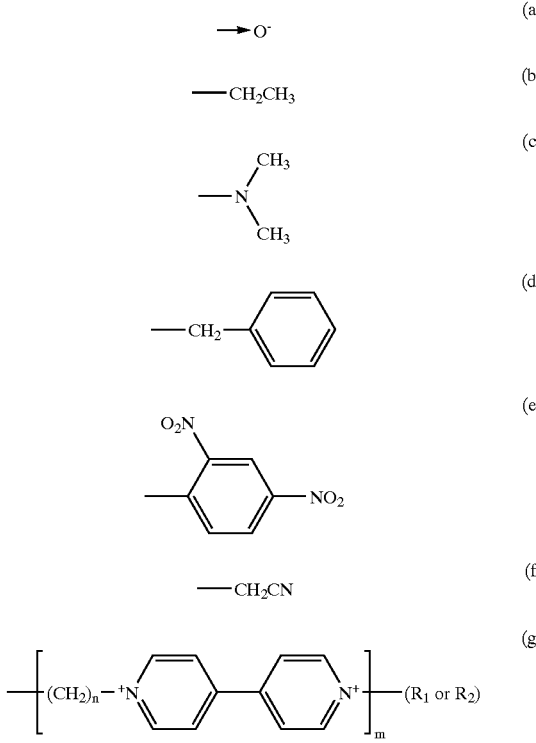

wherein $R_1$ is as defined above, $R_3$ is any of the formulae (a) to (f) given above under $R_2$, m is an integer of from 1 to 6, preferably 1 or 2 and n is an integer of from 1 to 10, conveniently 1 to 5.

A particularly preferred redox chromophore is a compound of formula II, viz. bis-(2-phosphonoethyl)-4,4'-bipyridinium dichloride

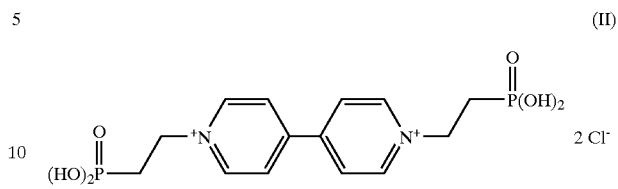
(II)

The semiconducting metallic oxide may be an oxide of any suitable metal, such as, for example, titanium, zirconium, hafnium, chromium, molybdenum, tungsten, vanadium, niobium, tantalum, silver, zinc, strontium, iron ($Fe^{2+}$ or $Fe^{3+}$) or nickel or a perovskite thereof. $TiO_2$, $WO_3$, $MoO_3$, $ZnO$ and $SnO_2$ are particularly preferred.

The invention also provides an electrochromic system comprising: a first electrode disposed on a transparent or translucent substrate; a second electrode; an electrolyte; an electron donor; and an electrochromic layer comprising a nanoporous-nanocrystalline film according to the invention intermediate the first and second electrodes.

The substrate is suitably formed from a glass or a plastics material. Glass coated with a conducting layer of fluorine doped tin oxide or indium tin oxide is conveniently used in the EC system of the present invention.

The electrolyte is preferably in liquid form and preferably comprises at least one electrochemically inert salt optionally in molten form in solution in a solvent. Examples of suitable salts include hexafluorophosphate, bis-trifluoromethanesulfonate, bis-trifluoromethylsulfonylamidure, tetraalkylammonium, dialkyl-1,3-imidazolium and lithium perchlorate. Examples of suitable molten salts include trifluoromethanesulfonate, 1-ethyl, 3-methyl imidazolium bis-trifluoromethylsulfonylamidure and 1-propyldimethyl imidazolium bis-trifluoromethylsulfonylamidure. Lithium perchlorate is particularly preferred.

The solvent may be any suitable solvent and is preferably selected from acetonitrile, butyronitrile, glutaronitrile, dimethylsulfoxide, dimethylformamide, dimethylacetamide, N-methyloxazolidinone, dimethyl-tetrahydropyrimidinone, γ-butyrolactone and mixtures thereof.

The electron donor is preferably a metallocene or a derivative thereof. The electron donor is preferably soluble in the electrolyte solvent. Ferrocene is particularly preferred.

DESCRIPTION OF THE DRAWINGS

The EC system prepared as described in the Example is illustrated in FIGS. 1–3 and the legends are presented in FIGS. 4–9, as follows.

DETAILED DESCRIPTION OF THE INVENTION

Figure 1:
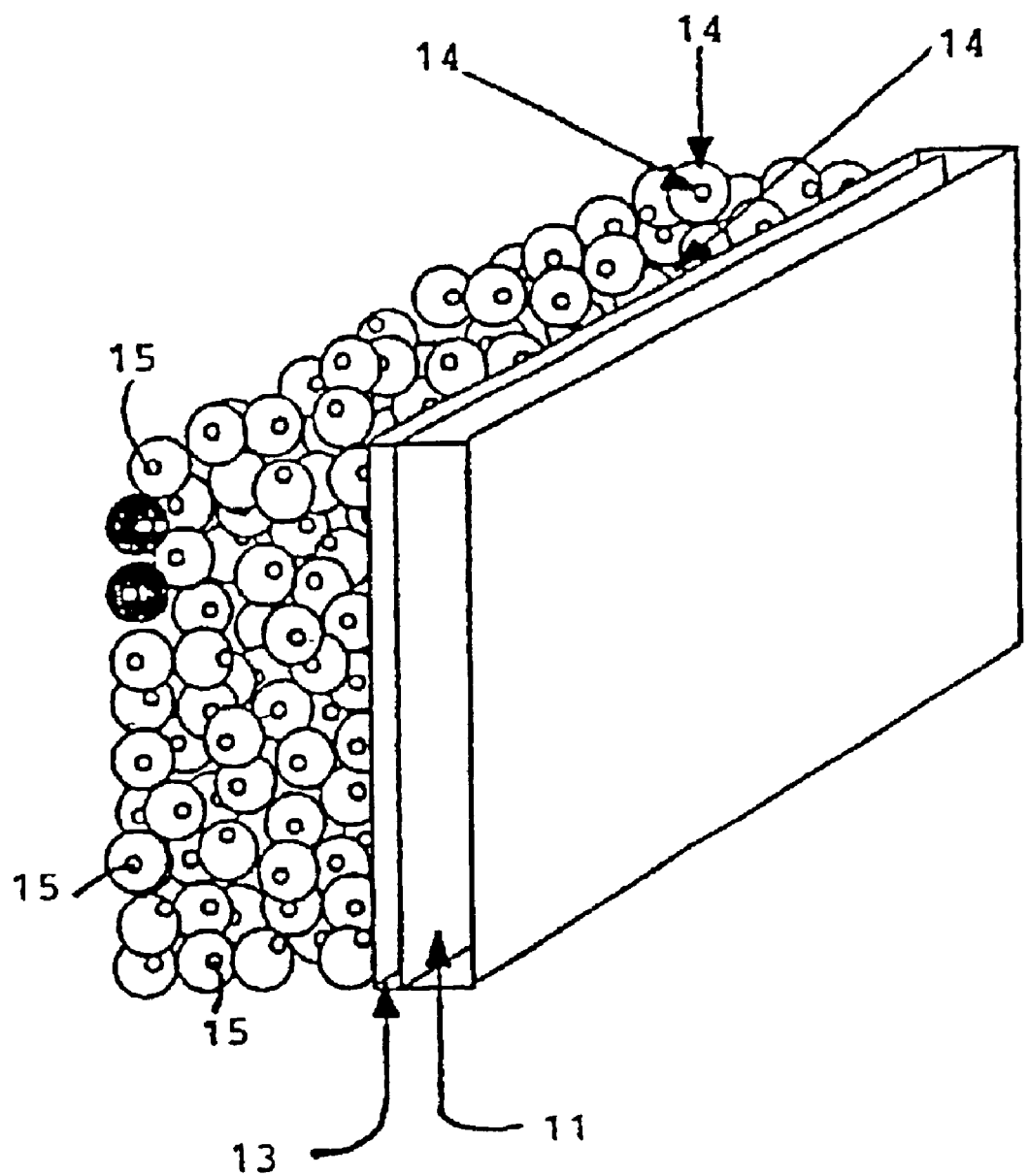
FIG. 1 is a schematic view of the prepared film disposed on a substrate.

The invention is illustrated in the following Example.

(a) A 2.5 cm×2.5 cm transparent nanostructured film, consisting of a 4 μm thick layer of fused TiO$_2$ nanocrystallites, was deposited on a 3.3 cm×3.3 cm fluorine doped tin oxide on glass substrate (Glastron, Trade Mark). A colloidal TiO$_2$ dispersion was prepared by hydrolysis of titanium tetraisopropoxide. The average diameter of the initially formed crystallites (7 nm) was increased by autoclaving at 200° C. for 12 hours to 12 nm. Concentrating the autoclaved dispersion to 160 g/l and adding Carbowax (Trade Mark) 20000 (40% wt. equiv. of TiO$_2$) yielded a white viscous sol. (Carbowax 20000 is an ethylene glycol polymer whose average molecular weight is 20000.) A 4 μm thick layer of the above sol was deposited using a screen printing technique on the conducting glass substrate. The resulting gel-film was dried in air for 1 h, sintered at 450° C. for 12 h and stored in a darkened vacuum desiccator prior to use.

(b) A redox chromophore, bis-(2-phosphonoethyl)-4,4'-bipyridinium dichloride was prepared by adding 4,4'-bipyridine (4.4 g) and diethyl-2-ethylbromophosphonate (15.0 g) to water (75 ml). The reaction mixture was refluxed for 72 h and allowed to cool. Following addition of conc. hydrochloric acid (75 ml) the reaction mixture was refluxed for a further 24 h. To recover the product, the reaction mixture was concentrated to 50 ml, isopropyl alcohol (200 ml) added drop-wise, stirred on ice for one hour and filtered. The white crystalline product was washed with cold isopropyl alcohol and air dried to give pure bis-(2-phosphonoethyl)-4,4'-bipyridinium dichloride (12.72 g, 84.24% yield). Calculated for bis-(2-phosphonoethyl)-4,4'-bipyridinium dichloride (C$_{14}$H$_{20}$N$_2$Cl$_2$O$_6$P$_2$):C, 37.77; H, 4.53; N, 6.29. Found: C, 35.09; H, 4.49; N, 6.09. $^1$H NMR (water-d$_2$): δ2.31–2.43 (m, 4H); δ4.68–4.80 (m, 4H); δ8.33 (d, unresolved metacoupling, 4H); δ8.94 (d, unresolved metacoupling, 4H).

(c) TiO$_2$ films, prepared as described above, were modified by adsorption of the redox chromophore prepared above from an aqueous solution (0.02 mol.dm$^{-3}$) over 24 h, washed with distilled deionised water, dried in air and stored in a darkened vacuum desiccator for 48 h prior to use.

(d) Using a screen printing technique, a 0.25 cm border of a proprietary epoxy resin (Araldite, Trade Mark) was deposited on a second 3.3×3.3 cm fluorine doped tin oxide conducting glass, leaving a small opening in one corner. This piece of conducting glass was placed on top of the modified TiO$_2$ film prepared as described above and left to set for 24 h.

(e) To complete construction of the EC system, the above sandwich structure was back-filled using an argon pressure with an electrolyte solution consisting of LiClO$_4$ (0.05 mol.dm$^{-3}$) and ferrocene (0.05 mol.dm$^{-3}$) in γ-butyrolactone (m.p. −45° C., b.p. 204° C.). The components of the electrolyte solution were carefully purified and rigorously dried prior to use. The opening was subsequently closed using Araldite (Trade Mark).

With reference to the drawings and in particular to FIG. 1, there is shown a first glass substrate 11 having a conductive layer 13 of fluorine doped tin oxide coated thereon. The exposed surface of the layer 13 is coated with a transparent nanostructured film 14 of TiO$_2$ having a redox chromophore 15 adsorbed thereon. The redox chromophore 15 is bis-(2-phosphonoethyl)-4,4-bipyridinium dichloride prepared as described in the Example.

Figure 2:
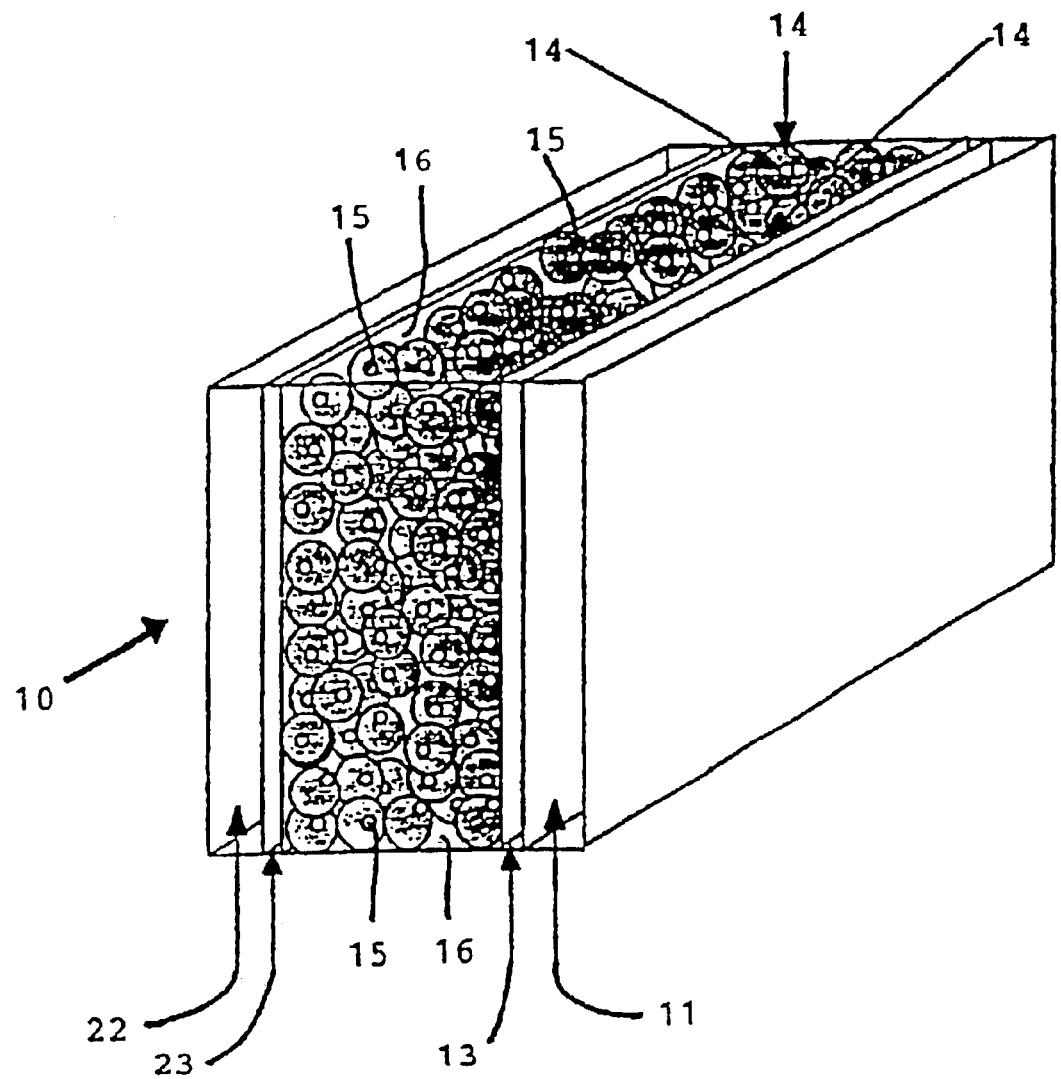
FIG. 2 is a schematic view of the prepared electrochromic system including the film shown in FIG. 1.
Figure 3:
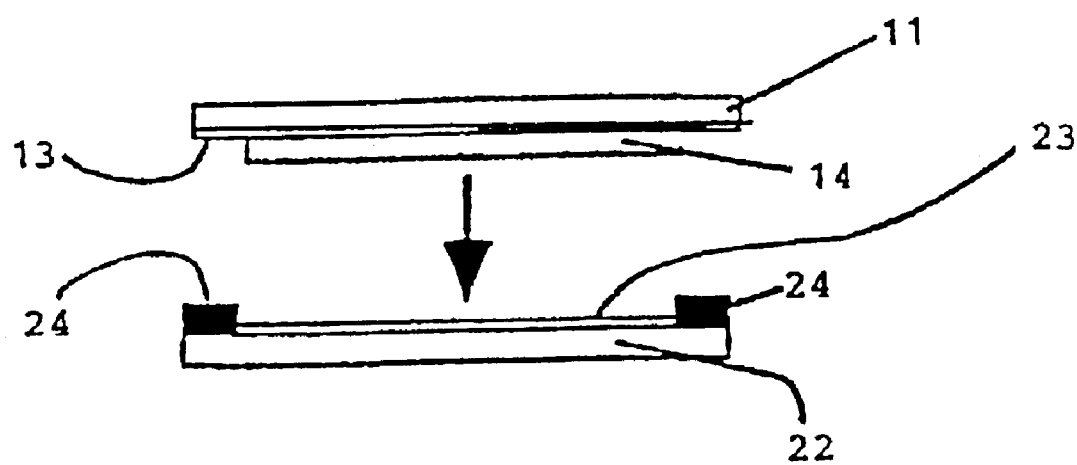
FIG. 3 is an exploded view of the electrochromic system of FIG. 2.
Figure 3:
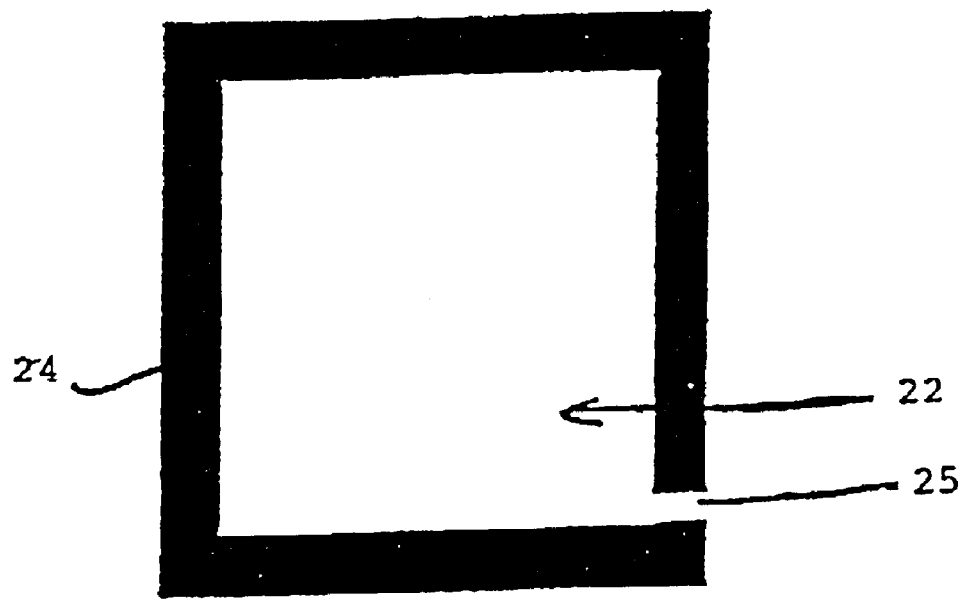

FIGS. 2 and 3 illustrate an EC system 10 according to the invention comprising the first glass substrate 11 with the layer 13 and the modified TiO$_2$ film 14 shown in FIG. 1 and a second glass substrate 22 having a conductive layer 23 of fluorine doped tin oxide coated thereon. The second glass substrate 22 has a 0.25 cm border 24 of epoxy resin deposited thereon with a small gap 25, which is sealed after addition of the electrolyte/electron donor solution 16 described above.

It will be observed that construction of the EC system 10 according to the invention is simple and utilises low-cost and non-toxic materials. These are particularly attractive features in the context of the large-scale manufacture of the EC system 10.

It should also be noted that due to surface roughness, of the order of 500 for a 4 μm film, no spacer is required in an EC system of the invention.

In prior art electrochromic systems, a dielectric spacer must be included to isolate the electrodes electrically from each other. In the present invention, no such spacer is required because the solid particle nature of the nanocrystalline film provides for sufficient electrical isolation between the electrodes. In a commercial version of the EC system according to the invention, the absence of a spacer will have a positive impact on the manufacturing costs of the system.

A number of EC systems prepared as described in the above Example were tested by applying 10000 cycles (15 s at −1.00V and 15 s at +1.0V at room temp.). A typical set of test results is shown in FIGS. 4a and 4b.

Figure 4A:
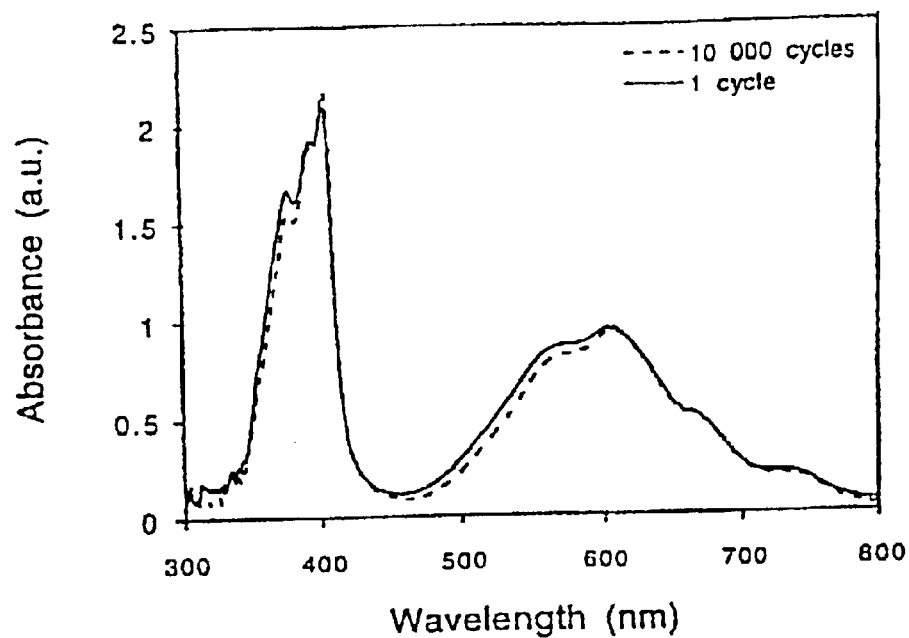
FIG. 4 shows: (a) Absorption spectrum of the EC system 10 in low transmittance state. (b) Test result of modified EC system 10 in (a) after 1 and 10000 test cycles.

Specifically, shown in FIG. 4a are the absorption spectra in the low transmittance (LT) state, after 1 and 10000 cycles. It will be observed that this spectrum, as expected, corresponds to that of the radical cation of the viologen moiety of the redox chromophore. It will also be noted that, in practice, this corresponds to an intense blue coloration of the EC system and that the extent of this coloration is not diminished after 10000 cycles.

Figure 4B:
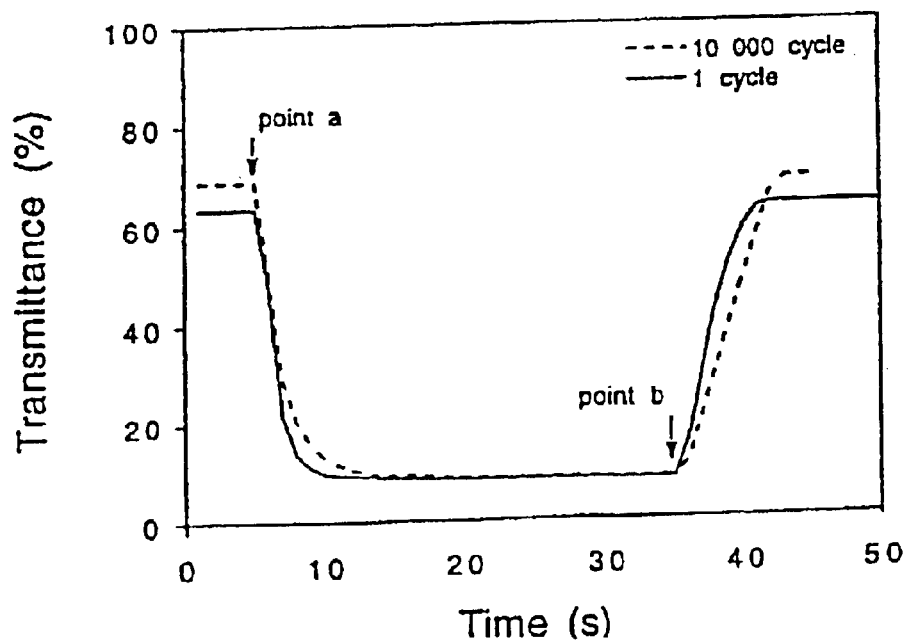

Concerning the change in transmittance, this is conventionally represented as in FIG. 4b. Specifically, it will be observed that the transmittance decreases from about 70% (point a, 10000 cycles) to about 8% (point b, 10000 cycles). Significantly, the transmittance has decreased to less than 20% of its initial value in less than 1 s. Similar behaviour is observed upon switching the EC system to the high transmittance (HT) state.

Figure 5A:
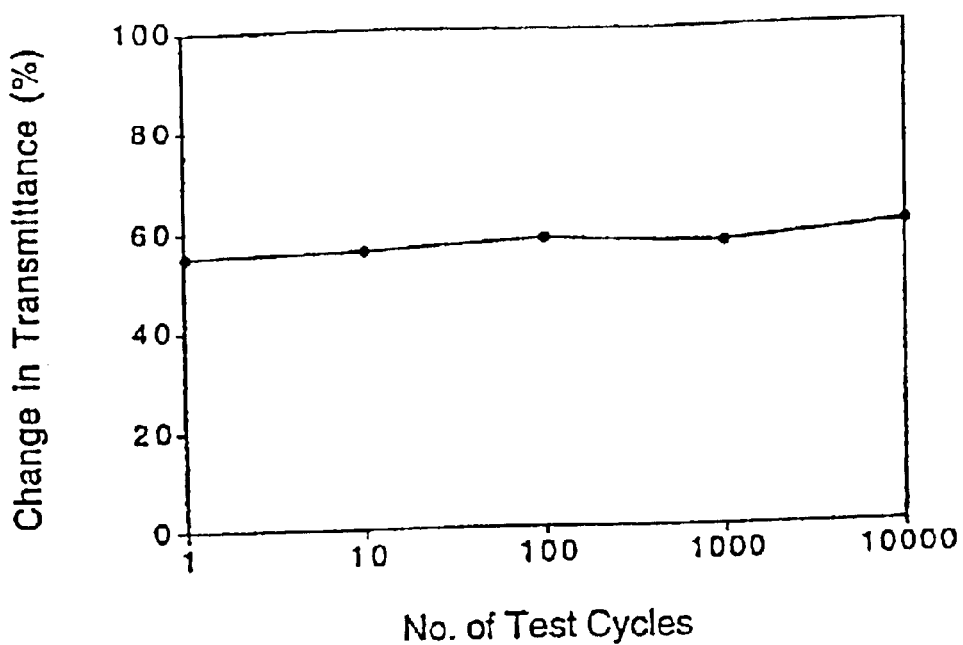
FIG. 5 shows: (a) Change in transmittance at 600 nm of the EC system 10 in FIG. 4 during 10000 test cycles. (b) Change in colouring and clearing times of the EC system 10 in (a) during 10000 test cycles.
Figure 5B:
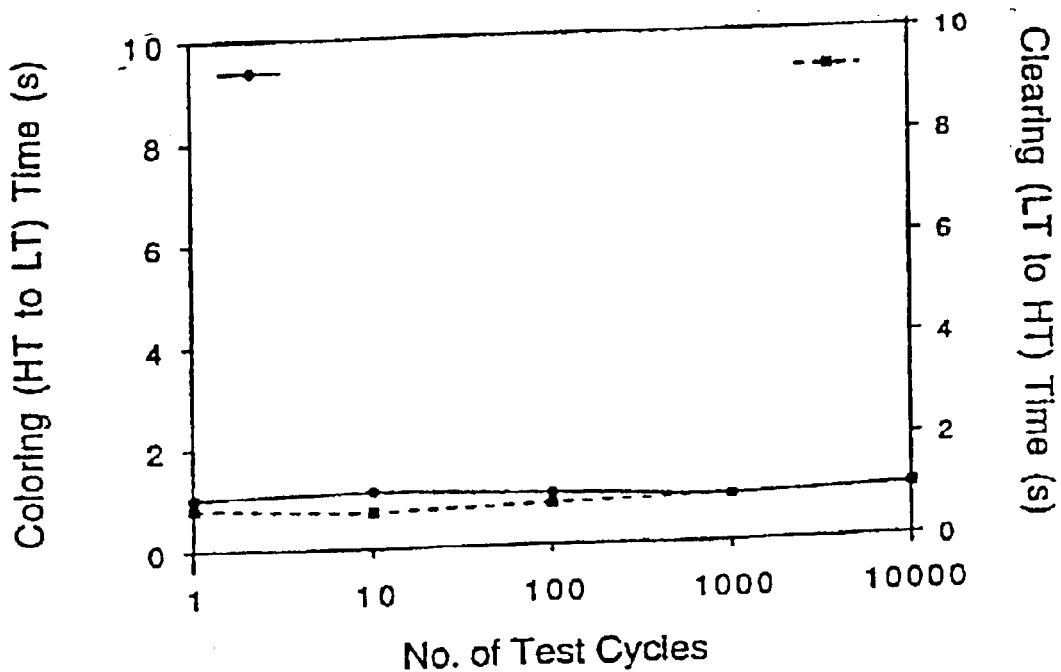

As stated, there is no significant degradation in performance over 10000 cycles. This is quantitatively demonstrated in FIGS. 5a and 5b. Specifically, shown in FIG. 5a is the change in transmittance measured after 1, 10, 100, 1000 and 10000 cycles. It should be noted that the slight improvement in performance observed is a reproducible feature. Shown in FIG. 5b, are plots of the switching times (as defined above) for the same EC system. These are consistently between 0.9 s and 1.1 s.

Nanostructured $TiO_2$ films were deposited on the following conducting glass substrates: Indium tin oxide glass and fluorine doped tin oxide glass. No significant difference in the performance in the resulting EC system was detected. The time for which a film is fired is important for the following reason: If a film is fired for 1 h its porosity, and consequently its surface roughness, will be optimal. However, under the same conditions, film conductivity will be less than optimal due to incomplete sintering of the constituent nanocrystallites. Conversely, if a film is fired for 168 h, its connectivity, and consequently its conductivity, will be optimal.

Figure 6A:
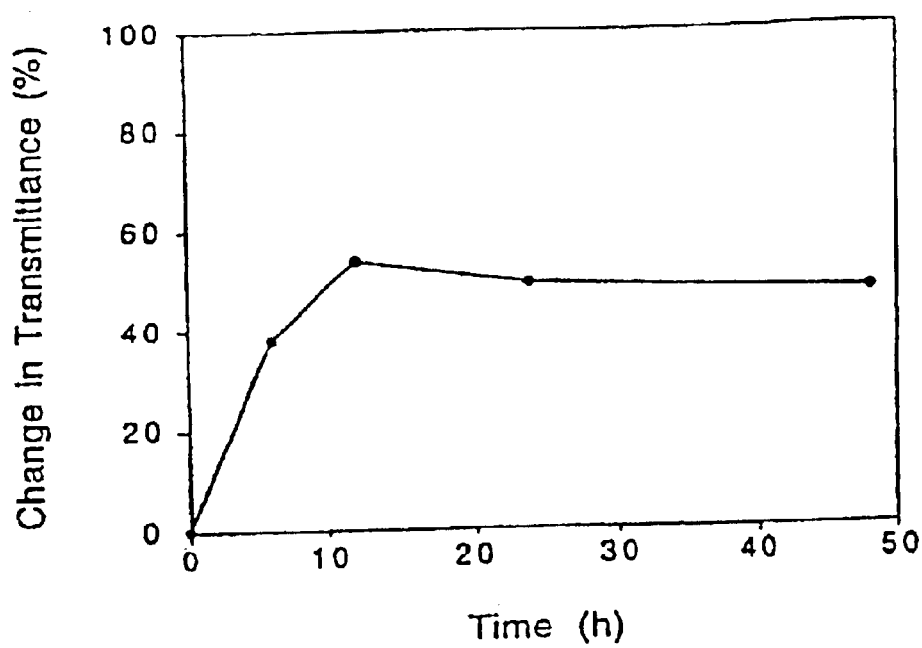
FIG. 6 shows: (a) Change in transmittance at 600 nm of modified EC system 10 after 10000 test cycles as a function of the firing time of nanostructured film. (b) Test results of modified EC system 10 in (a) after 10000 test cycles.
Figure 6B:
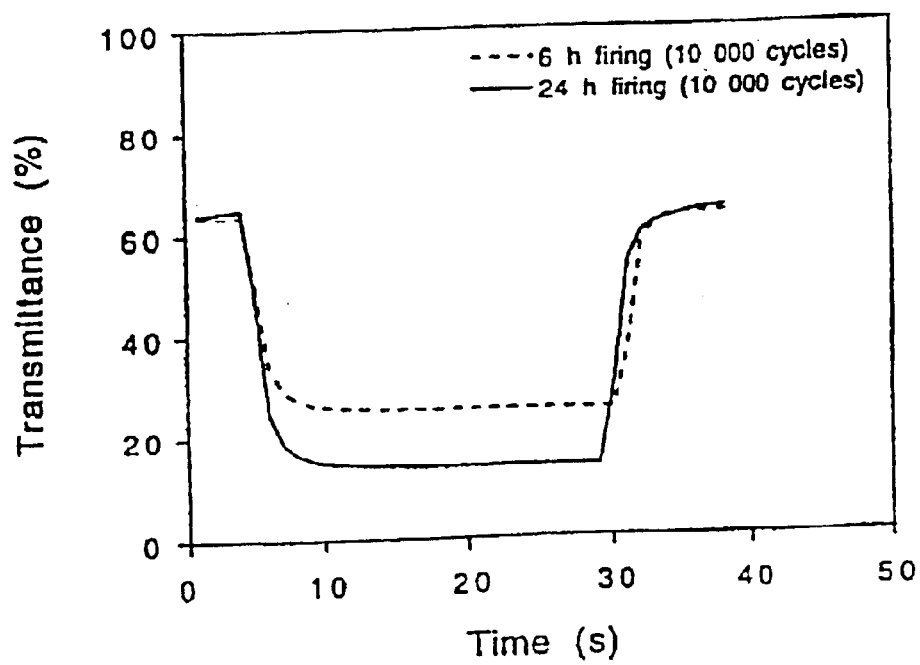

However, under the same conditions, film porosity will be less than optimal due to collapse of the film's nanostructure as will be observed in FIGS. 6a and 6b. Shown in FIG. 6a are the transmittance changes after 10000 cycles on switching an EC system in which the constituent nanoporous-nanocrystalline film has been fired for the indicated time. The best performance is obtained for systems containing films that have been fired for 12 h. However, as can be seen from FIG. 6b, while there is improved colouring on going from 6 to 12 h firing time there is no corresponding decrease in the colouring or clearing time. Film thickness was 4 μm or less.

The film firing temperature should be above about 400° C. to remove the added Carbowax, the addition of which is essential to ensure a porous film, and less than 500° C. to prevent conversion of anatase to rutile, the latter being a significantly poorer conductor. For these reasons the firing temperature was fixed at approximately 450° C.

The substituent groups of the redox chromophore are irreversibly chemisorbed at $Ti^{4}+$ sites at the surface of the $TiO_2$ nanocrystallites that constitute the nanoporous-nanocrystalline film. These substituent groups, referred to as linker groups, serve, therefore, to irreversibly attach the redox chromophore to the surface of the nanoporous-nanocrystalline film. The density of these states (about $5 \times 10^{13}.cm^{-2}$), and the surface roughness, (about 1000 for a 4 μm film) provide the upper limit for the number of molecular amplifiers which may be adsorbed per unit geometric area. It should also be noted that, unlike previous linkers, there is no discoloration of the modified film due to the existence of a charge transfer interaction between the occupied molecular orbitals of the linker and the available conduction band stated of the semiconductor substrate. With regard to the redox chromophore, the viologen moiety is stable with a large associated change in extinction for a one electron reduction. Further, the redox chromophore may be readily modified to change its electrochemical and optical properties by use of the various substituents associated with R in the general formula. Each variation possesses different formal potentials and different colours upon being switched. Furthermore, the redox chromophore may be readily prepared with high yield in a pure form and, perhaps most importantly, adsorbed onto the $TiO_2$ substrate from an aqueous solution.

Figure 7A:
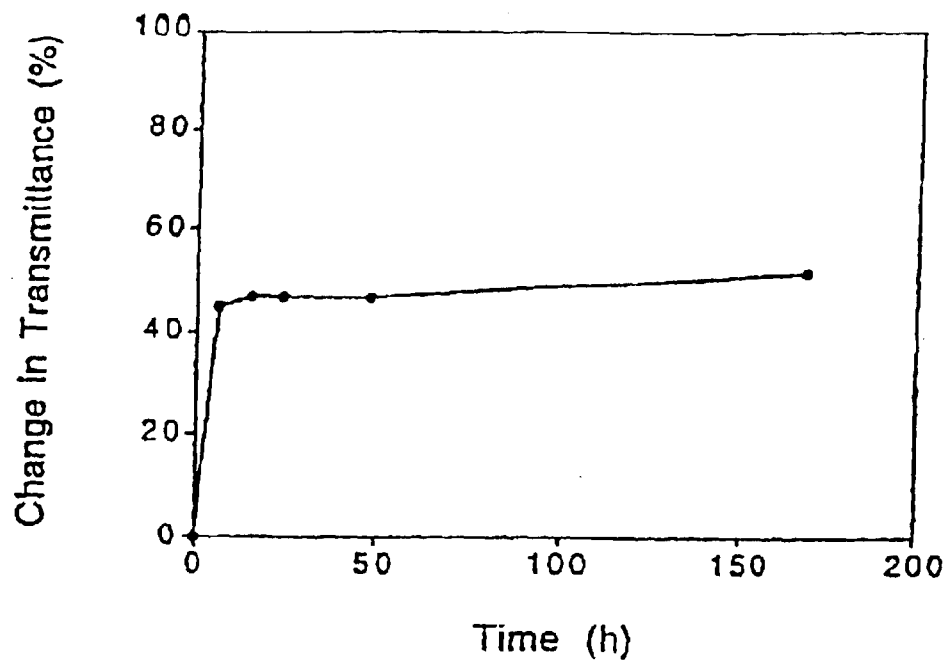
FIG. 7 shows: (a) Change in transmittance at 600 nm of modified EC system 10 after 10000 test cycles as a function of the dying time of nanostructured film. (b) Test results of modified EC system 10 in (a) after 10000 test cycles.
Figure 7B:
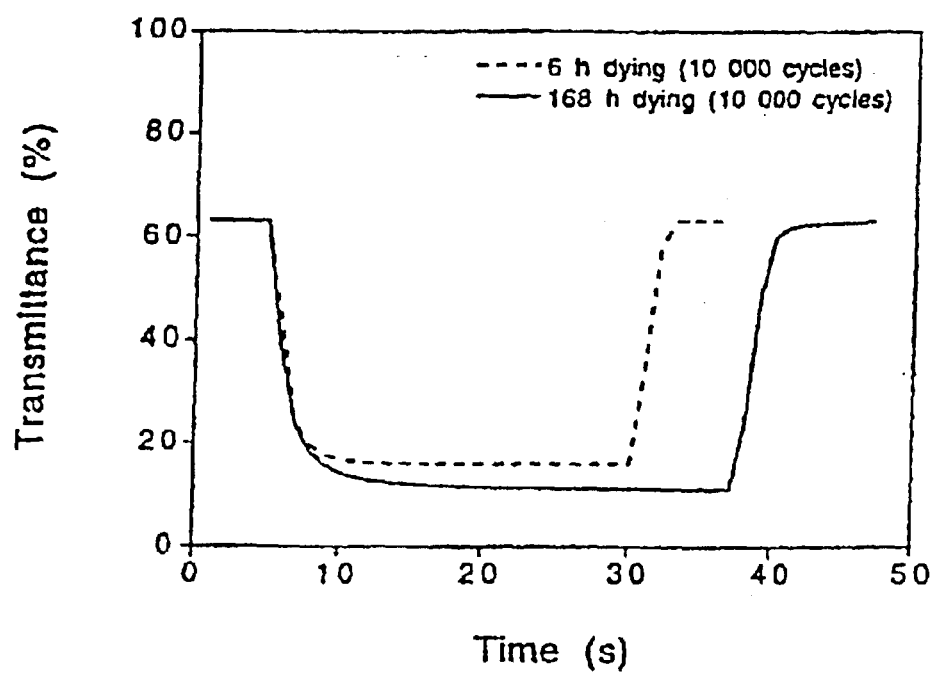

One parameter which was studied in respect of the redox chromophore was the extent of modifier adsorption in a given period. As would be expected, the redox chromophore is adsorbed to an increasing extent from more concentrated solutions in a shorter time. In practice, for a 0.02 $mol.dm^{-3}$ aqueous solution of the redox chromophore, close to maximum coverage is observed after about 6 h with only a small subsequent increase in coverage during the following week, see FIGS. 7a and 7b. Some variability of this process is observed. The electrolyte solution consists of $LiClO_4$ (0.05 $mol.dm^{-3}$) and ferrocene (0.05 $mol.dm^{-3}$) in γ-butyrolactone (BL) (m.p. −45° C., b.p 204° C.). The concentration of the $LiClO_4$ and ferrocene were systematically varied and the results of these studies are summarised in FIGS. 8a, 8b, 9a and 9b.

Figure 8A:
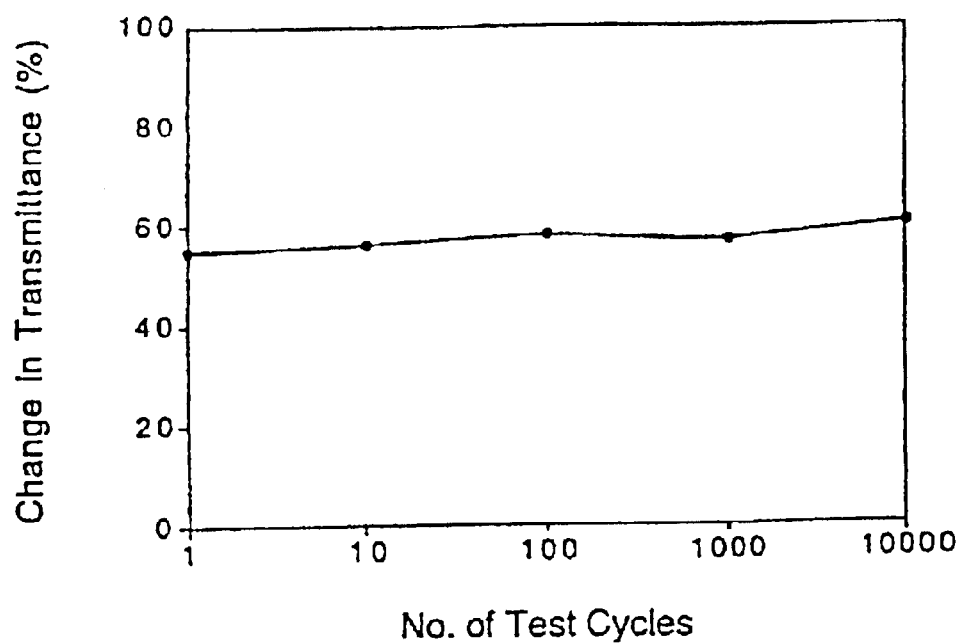
FIG. 8 shows: (a) Change in transmittance at 600 nm of modified EC system 10 containing 0.20 mol.dm$^{-3}$ LiClO$_4$ during 10000 test cycles. (b) Change in colouring and clearing times of modified EC system 10 in (a) during 10000 test cycles.
Figure 8B:
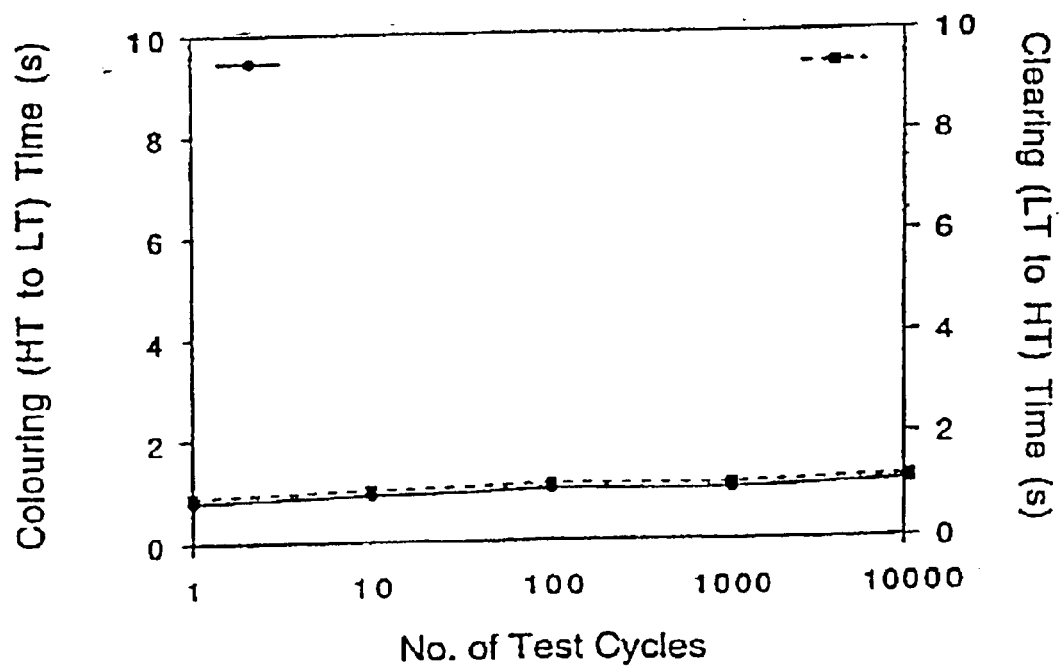
Figure 9A:
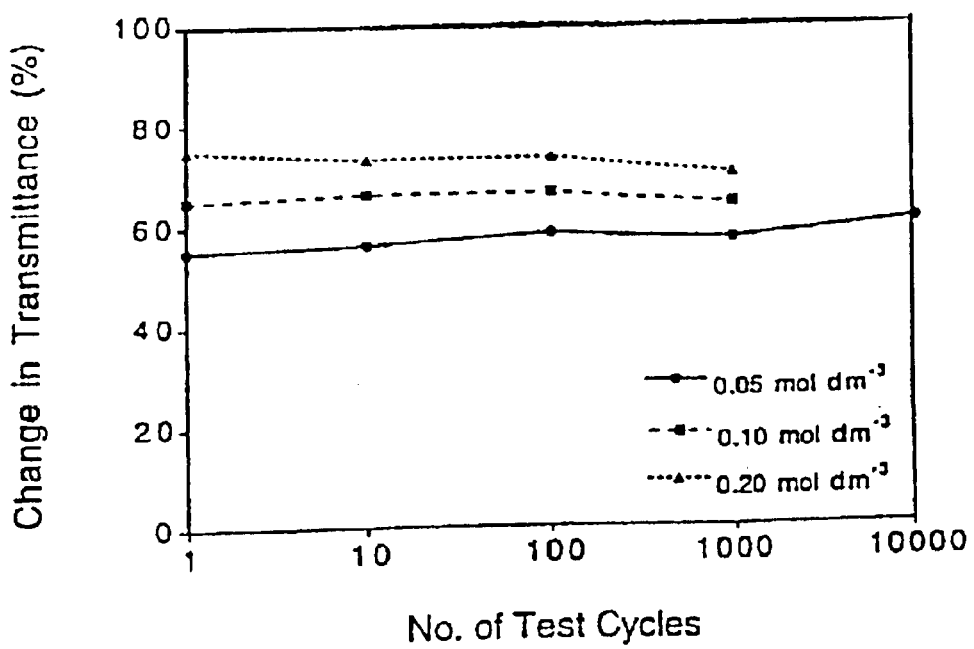
FIG. 9 shows: (a) Change in transmittance at 600 nm of modified EC system 10 containing 0.05, 0.10 and 0.20 mol.dm$^{-3}$ ferrocene during 10000 test cycles. (b) Change in colouring and clearing times of modified EC systems 10 in (a) during 10000 test cycles.
Figure 9B:
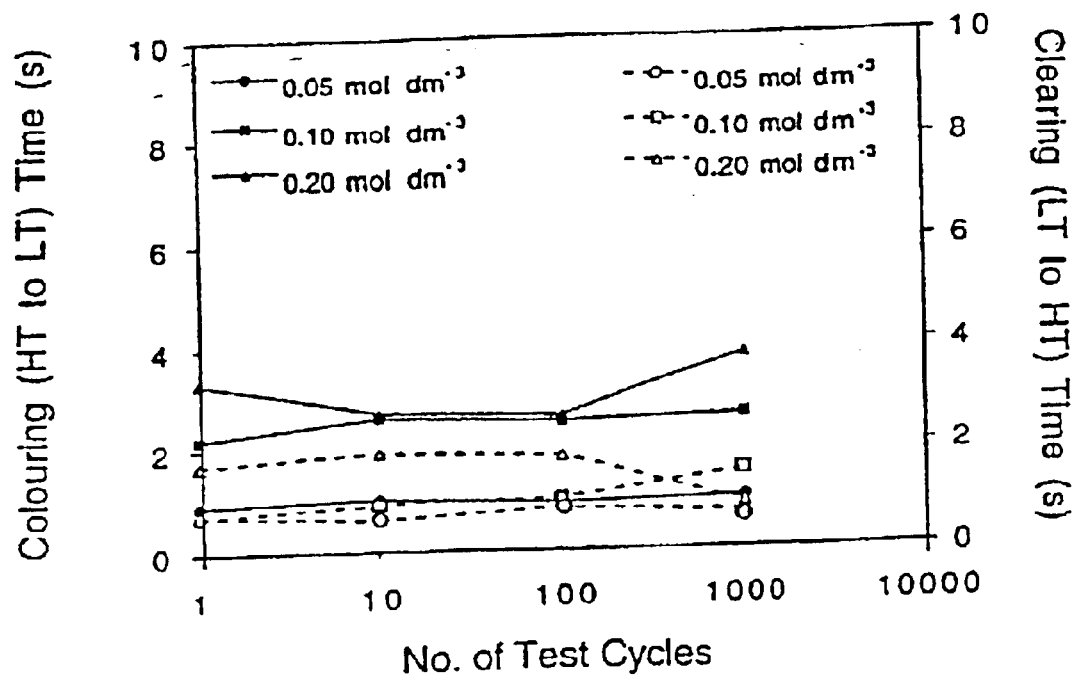

The concentration of added $LiClO_4$, in the range 0.05 $mol.dm^{-3}$ to 0.20 $mol.dm^{-3}$, has no effect on the magnitude of the transmittance change or on the colouring or clearing times (see FIGS. 8a and 8b). On the other hand increasing the concentration of added ferrocene, in the range 0.05 $mol.dm^{-3}$ to 0.20 $mol.dm^{-3}$, increases significantly the magnitude of the transmittance change and less significantly the colouring and clearing times (see FIGS. 9a and 9b). The disadvantage of the latter is that the ferrocene attacks the epoxy resin seal on the cell and results in device failure after about 48 h.

What is claimed is:

1. A method for the manufacture of an electrochromic system using a nanoporous-nanocrystalline film comprising a semiconducting metallic oxide having a redox chromophore adsorbed thereto, wherein the redox chromophore comprises a compound of the formula

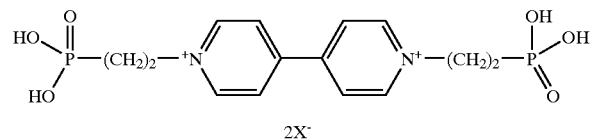

2X⁻ wherein X is a charge balancing ion, the method comprising the steps of:

(a) providing an electrochromic system comprising a first and a second electrode; and (b) disposing said nanoporous-nanocrystalline film on said first or second electrode.

2. A method for the manufacture of an electrochromic system using a nanoporous-nanocrystalline film comprising a semiconducting metallic oxide having a redox chromophore adsorbed thereto, wherein the redox chromophore comprises a compound of the formula

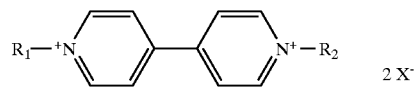

2 X⁻ wherein X is a charge balancing ion; $R_1$ is one of the following

-continued

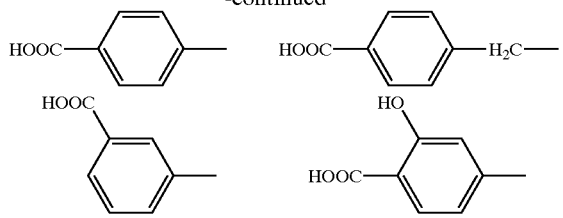

and R₂ is one of the following:

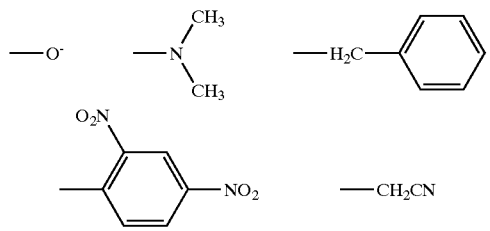

the method comprising the steps of:

(a) providing an electrochromic system comprising a first and a second electrode; and (b) disposing said nanoporous-nanocrystalline film on said first or second electrode.

3. A method for the manufacture of an electrochromic system using a nanoporous-nanocrystalline film comprising a semiconducting metallic oxide having a redox chromophore adsorbed thereto, wherein the redox chromophore comprises a compound of the formula

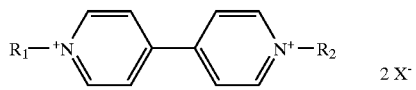

wherein X is a charge balancing ion; $R_1$ is one of the following

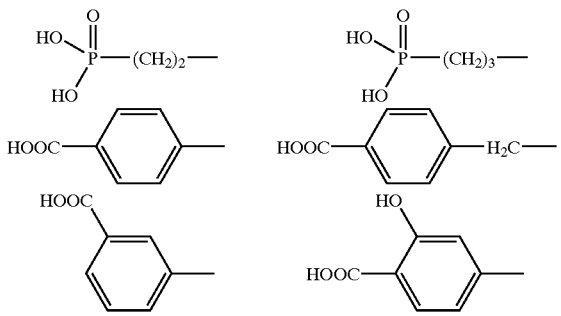

and $R_2$ is

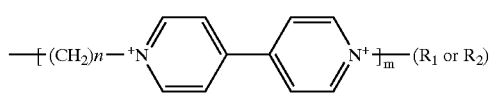

where m is an integer of from 1 to 6 and n is an integer of from 1 to 10, the method comprising the steps of:

(a) providing an electrochromic system comprising a first and a second electrode; and (b) disposing said nanoporous-nanocrystalline film on said first or second electrode.

4. The method of claim 3, wherein m is 1 or 2 and n is an integer of from 1 to 5.

5. The method of claim 3, wherein $R_1$ is

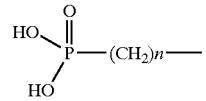

wherein n is 2 or 3.

6. The method of claim 3, wherein m is 1 or 2 and n is an integer of from 1 to 5, and wherein $R_1$ is

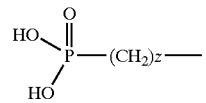

wherein z is 2 or 3.

7. The method of claim 1, wherein the metallic oxide of the nanoporous-nanocrystalline film is an oxide of a metal selected from titanium, zirconium, hafnium, chromium, molybdenum, tungsten, vanadium, niobium, tantalum, silver, zinc, strontium, iron ($Fe^{2+}$ and $Fe^{3+}$) and nickel and perovskites thereof, preferably $TiO_2$, $WO_3$, $MoO_3$, ZnO or $SnO_2$.

8. The method of claim 2, wherein the metallic oxide of the nanoporous-nanocrystalline film is an oxide of a metal selected from titanium, zirconium, hafnium, chromium, molybdenum, tungsten, vanadium, niobium, tantalum, silver, zinc, strontium, iron ($Fe^{2+}$ and $Fe^{3+}$) and nickel and perovskites thereof, preferably $TiO_2$, $WO_3$, $MoO_3$, ZnO or $SnO_2$.

9. The method of claim 3, wherein the metallic oxide of the nanoporous-nanocrystalline film is an oxide of a metal selected from titanium, zirconium, hafnium, chromium, molybdenum, tungsten, vanadium, niobium, tantalum, silver, zinc, strontium, iron ($Fe^{2+}$ and $Fe^{3+}$) and nickel and perovskites thereof, preferably $TiO_2$, $WO_3$, $MoO_3$, ZnO or $SnO_2$.

* * * * *